United States Patent [19]

Mass

[11] Patent Number: 5,488,805
[45] Date of Patent: Feb. 6, 1996

[54] AIR EXTRACTING DYNAMIC SEAL

[75] Inventor: Noah B. Mass, Ann Arbor, Mich.

[73] Assignee: Ford Motor Company, Dearborn, Mich.

[21] Appl. No.: 417,555

[22] Filed: Apr. 6, 1995

[51] Int. Cl.$^6$ ....................................... E06B 7/16
[52] U.S. Cl. .................... 49/490.1; 49/475.1; 296/76; 296/208
[58] Field of Search .................. 49/490.1, 476.1, 49/475.1; 296/76, 208

[56] References Cited

U.S. PATENT DOCUMENTS

| | | |
|---|---|---|
| 2,297,892 | 10/1942 | Jacobs . |
| 3,391,628 | 7/1968 | Ziegenfelder . |
| 3,525,296 | 8/1970 | Haapanen . |
| 3,927,493 | 12/1975 | Tseneishi et al. . |
| 4,952,442 | 8/1990 | Warner ............... 49/490.1 X |
| 5,122,406 | 6/1992 | Sakamaki et al. ........ 49/490.1 X |
| 5,255,472 | 10/1993 | Larsen et al. ............ 49/490.1 |

*Primary Examiner*—Philip C. Kannan
*Attorney, Agent, or Firm*—Daniel M. Stock; Roger L. May

[57] ABSTRACT

A combination seal is provided for dynamically sealing the interface between an automotive vehicle body and an associated closure panel. The seal provides a compressible sealing portion of bulbous shape and a valve portion that normally seals the interior of the vehicle against the inward passage of fluid and permits venting the interior to the atmosphere upon a certain build-up of pressure within the vehicle body.

15 Claims, 2 Drawing Sheets

AIR EXTRACTING DYNAMIC SEAL

BACKGROUND OF THE INVENTION

1. Field of the Invention

The present invention relates generally to seals for automotive closure panels and to automotive body venting, and more specifically to provision of an air extracting valve for a dynamic seal disposed between a closure panel and an automobile body.

2. Description of the Prior Art

It is well known in the prior art to provide a weatherstrip between a closure panel of a vehicle and an adjacent portion of the vehicle body. It is also known, as seen in U.S. Pat. No. 3,927,493, to Tsuneishi et al, to drain water leaking onto a gutter external of the weatherstrip.

It is also known to provide air pressure release for the interior of an automobile. U.S. Pat. No. 2,297,892, to Jacobs, is an early example of such a device.

Providing an air pressure release device or air extractor in an automotive vehicle body presents weight, cost, and complexity problems to the automotive designer. Modern conventional air extractors are typically manufactured from multiple hard plastic components, assembled into an automobile body which has been pierced by an otherwise unneeded aperture to receive the air extractor. The cost, weight, component complexity, and attendant assembly time and material associated with installation into the vehicle disadvantage the providing of the air extracting function to manage the airflow outwardly with respect to the vehicle.

An additional disadvantage of the provision of separate air extracting devices in the vehicle body is the potential reduction of structural integrity in the vehicle body owing to the provision of the holes necessary to receive the air extracting devices.

SUMMARY OF THE INVENTION

The disadvantages of the prior art air extraction devices are overcome in the present invention by combining the functions of a weatherstrip or dynamic seal for an automotive closure panel positioned between the panel and an adjacent portion of the vehicle body. The invention air extracting dynamic seal includes a resilient body, a mounting portion carried with the body and secured to an adjacent portion of the vehicle body, a compressible sealing portion performing the weatherstrip function and sealingly engageable with the closure panel, and an extractor valve portion carried with the body that is movable between a first position blocking fluid passage inwardly of the body and a second position responsive to an increase in fluid pressure within the body above a predetermined value to permit passage of fluid outwardly of the body.

According to one aspect of the present invention, the air extracting dynamic seal is integrally molded.

According to another aspect of the present invention, the extractor valve portion is economically formed as a resilient flap member.

BRIEF DESCRIPTION OF THE DRAWINGS

The overcoming of the disadvantages of the prior art and these features and advantages of the present invention will be apparent to those skilled in the automotive body sealing and air management arts upon reading the following description with reference to the accompanying drawings, in which.

DESCRIPTION OF THE PREFERRED EMBODIMENTS

Figure 1:
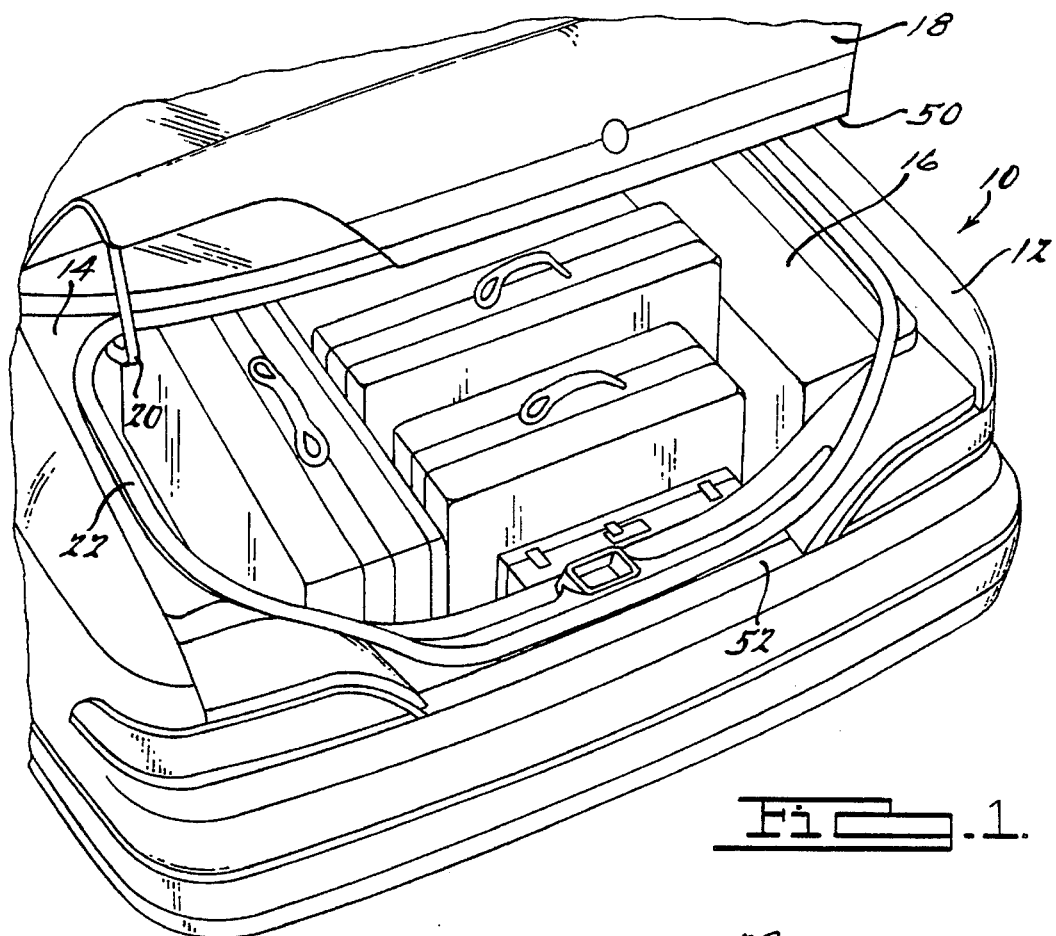
FIG. 1 is a perspective view of the rear of an automotive vehicle illustrating a weatherstrip positioned on a trunk aperture of the vehicle.
Figure 3:
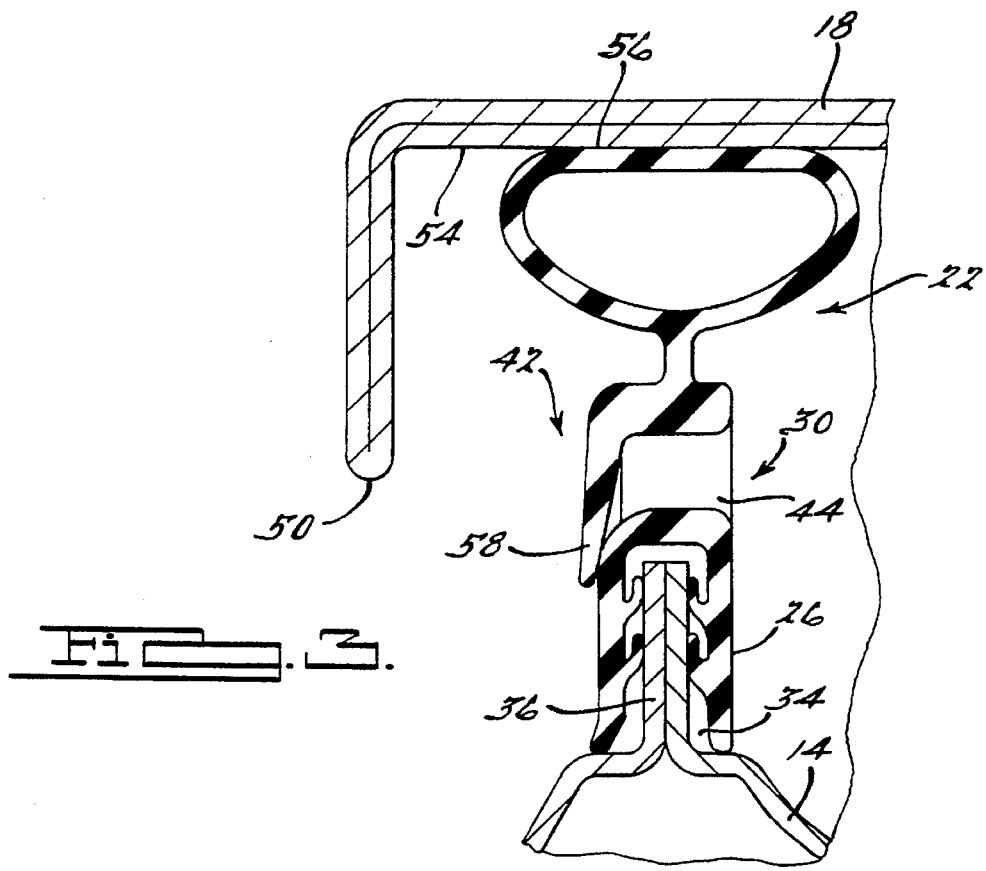
FIG. 3 is a cross section view of the dynamic seal of the present invention with the closure panel sealingly engaging the dynamic seal and the extractor valve in the closed position.
Figure 4:
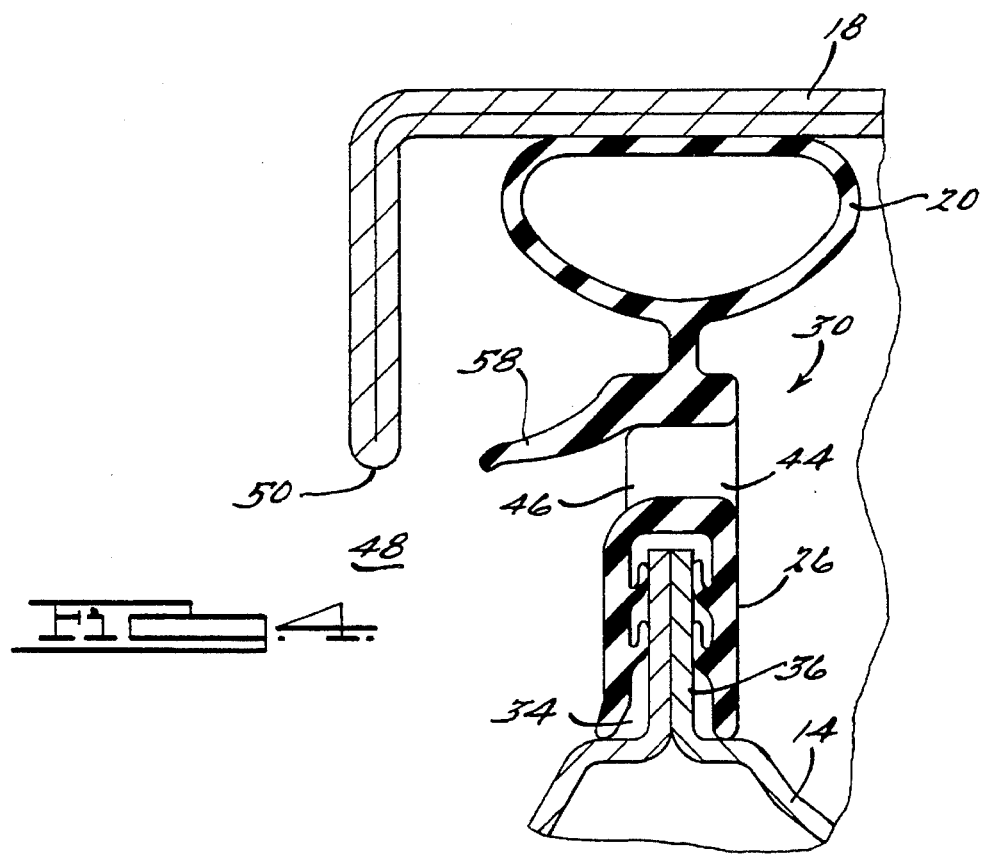
FIG. 4 is a view similar to FIG. 3 showing the extractor valve in the open position.

Turning now to the drawings, and particularly to FIG. 1 thereof, an automotive vehicle 10 is illustrated as having a body 12 including a portion 14 surrounding a trunk aperture 16 selectively closed by a pivotally mounted deck lid or trunk panel 18, the pivotal mounting being effected as by the hinge indicated at 20. Surrounding the aperture 16 is an air extracting dynamic seal 22 according to the present invention. The air extracting dynamic seal 22 operates to dynamically sealingly engage the deck lid 18 as may best be seen in FIGS. 3 and 4 upon movement from the open position shown in FIG. 1 to a closed position such as illustrated in FIGS. 3 and 4.

Figure 2:
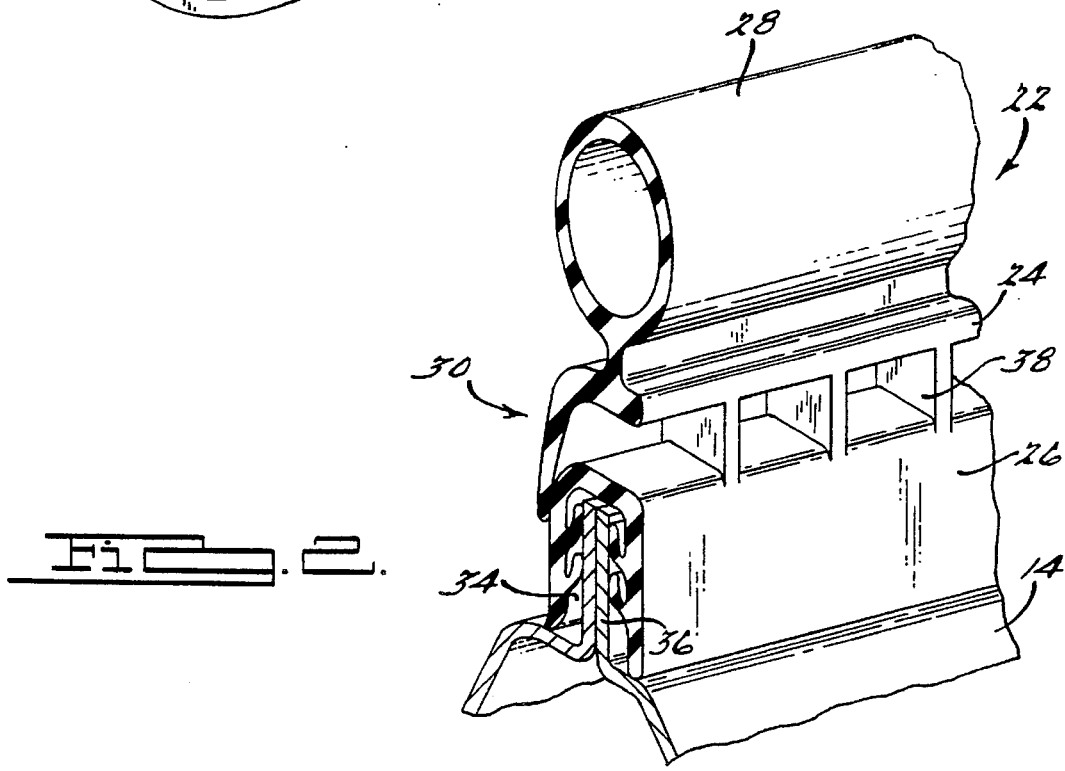
FIG. 2 is a perspective cross section view of the dynamic seal of the present invention illustrated as installed on a portion of the automotive vehicle body.

Turning now to FIG. 2, the air extracting dynamic seal 22 is illustrated as having a resilient body 24, a finned mounting portion 26, a compressible sealing portion 28, and an air extracting valve portion 30. In the preferred embodiment, the mounting portion 26, the sealing portion 28, and the extractor valve portion 30 form a unitary structure with the body 24 and are integrally molded with it from a suitable rubber-like material such as plastics well known in the automotive body arts.

The finned mounting portion 26 is of generally rectangular cross section and includes retrorse fins 32 angled to define a channel, indicated generally at 34, for being engaged in push-fit relationship over a pinch weld flange 36 formed on the body portion 14.

The compressible sealing portion 28 is illustrated as being of hollow, circular cross section, but it will be understood that any compliant sealing cross section of generally bulbous design, whether hollow or not, may be suitable for a particular sealing application.

The extractor valve portion 30 is illustrated as being positioned intermediate the compressive sealing portion 28 and the mounting portion 26. It includes a plurality of passages 38, which may extend throughout the length of the body 24 to surround the aperture 16. The passages 38 extend from the interior side 40 of the dynamic seal 22 to the outer side 42 thereof. Each passage 38 includes an inner end 44 communicating with the interior of the vehicle 10 and an outer end 46 communicating with the exterior of the vehicle 10 through an opening, indicated generally at 48 in FIG. 4, between the lower edge 50 of the deck lid 18 and an adjacent portion of the body 12, such as indicated at 52.

Turning now to FIGS. 3 and 4, the operation of the air extracting dynamic seal 22 of the present invention may be appreciated where, upon closure of the deck lid 18, sealing engagement is effected between internal surface 54 of the deck lid 18 and the outer surface 56 of the compressive sealing portion 28. The extractor valve portion 30 includes a cantilevered flap 58 that is molded to be resiliently biased toward the closed position of FIGS. 3 and 4, in which the outer ends 46 of the passages 38 are closed. When fluid pressure, that is, air pressure, within the automotive vehicle 10 is approximately equal to atmospheric pressure, the flap member 58 assumes the position of FIG. 3, sealing the interior of the body 12 from the atmosphere, and upon a buildup of pressure during operation of the vehicle or during closure of the deck lid 18 or other closure panels of the vehicle, the flap 58 pivots to the open position shown in FIG. 3, permitting venting of air from the interior of the vehicle to the exterior. The flap 58 is preferably molded to project in cantilever fashion as shown to normally cover the passages 38. Material properties and flap sizes and configurations may be chosen to set the pressure differential at which opening movement will occur.

While only one embodiment of the air extracting dynamic seal of the present invention has been described, others may occur to those skilled in the automotive vehicle sealing or air handling arts which do not depart from the scope of the following claims.

I claim:

1. An air extracting dynamic seal for selectively effecting sealing engagement between a closure panel of an automotive vehicle movable between an open and a closed position with respect to the body of the vehicle and a fixed portion of the body of the vehicle enclosing the interior of the body, the seal comprising:

a resilient body;

a mounting portion carried with the body and secured to the fixed portion of the body of the vehicle;

a compressible sealing portion carried with the body sealingly engageable with the closure panel when the closure panel is in the closed position to prevent fluid passage between the interior of the vehicle body and the atmosphere; and an extractor valve portion carried with the body having first position blocking fluid passage inwardly to the body of the vehicle and operative in response to an increase in fluid pressure within the body above a predetermined value to permit passage of fluid outwardly of the body of the vehicle.

2. An air extracting dynamic seal as defined in claim 1 wherein said body, said mounting portion, said compressible sealing portion, and said extractor valve portion are integrally molded.

3. An air extracting dynamic seal as defined in claim 2 wherein said extractor valve portion is positioned intermediate said mounting portion and said compressible sealing portion.

4. An air extracting dynamic seal as defined in claim 1 wherein said extractor valve portion comprises:

a passage formed through the seal body and having an inner end open to the interior of the body of the vehicle and an outer end open to the atmosphere; and a valve member mounted on the body adjacent the outer end of the passage and resiliently biased toward a sealing position closing said passage and movable to a vent position opening said passage in response to said increase in fluid pressure.

5. An air extracting dynamic seal as defined in claim 4 wherein said extractor valve portion is positioned intermediate said mounting portion and said compressible sealing portion.

6. An air extracting dynamic seal as defined in claim 1 wherein said extractor valve portion is positioned intermediate said mounting portion and said compressible sealing portion.

7. An air extracting dynamic seal as defined in claim 1 wherein said valve member comprises a resilient flap projecting in cantilever fashion from said body adjacent said passage.

8. An air extracting dynamic seal as defined in claim 7 wherein said valve member comprises a resilient flap integrally molded with said seal body and projecting in cantilever fashion therefrom adjacent said passage.

9. An air extracting dynamic seal as defined in claim 1 wherein said mounting portion comprises a finned channel receivable in push-fit relationship on the fixed part of the vehicle body.

10. An air extracting dynamic seal as defined in claim 1 wherein said compressible sealing portion comprises a hollow bulbous portion integrally molded with the body.

11. An air extracting dynamic seal for selectively effecting sealing engagement between a closure panel of an automotive vehicle movable between an open and a closed position with respect to the body of the vehicle and a fixed portion of the body of the vehicle enclosing the interior of the body, the seal comprising:

a unitary seal body molded of resilient material and having:

a mounting portion defining a finned channel receivable in push-fit relationship on the fixed portion of the vehicle body;

a hollow bulbous compressible sealing portion sealingly engageable with the closure panel when the closure panel is in the closed position to prevent fluid passage between the interior of the vehicle body and the atmosphere; and an extractor valve portion carried with the body having first position blocking fluid passage inwardly to the body of the vehicle and operative in response to an increase in fluid pressure within the body above a predetermined value to permit passage of fluid outwardly of the body of the vehicle.

12. An air extracting dynamic seal as defined in claim 11 wherein said extractor valve portion comprises:

a passage formed through the seal body and having an inner end open to the interior of the body of the vehicle and an outer end open to the atmosphere; and a valve member mounted on the body adjacent the outer end of the passage and resiliently biased toward a sealing position closing said passage and movable to a vent position opening said passage in response to said increase in fluid pressure.

13. An air extracting dynamic seal as defined in claim 11 wherein said extractor valve portion is positioned intermediate said mounting portion and said compressible sealing portion.

14. An air extracting dynamic seal as defined in claim 13 wherein said valve member comprises a resilient flap projecting in cantilever fashion from said body adjacent said passage.

15. An air extracting dynamic seal as defined in claim 13 wherein said valve member comprises a resilient flap integrally molded with said seal body and projecting in cantilever fashion therefrom adjacent said passage.

* * * * *